9351X
I S Wright
No Printed Specification Available
Straw Cutter.
No.
Patented Feb. 3, 1836.
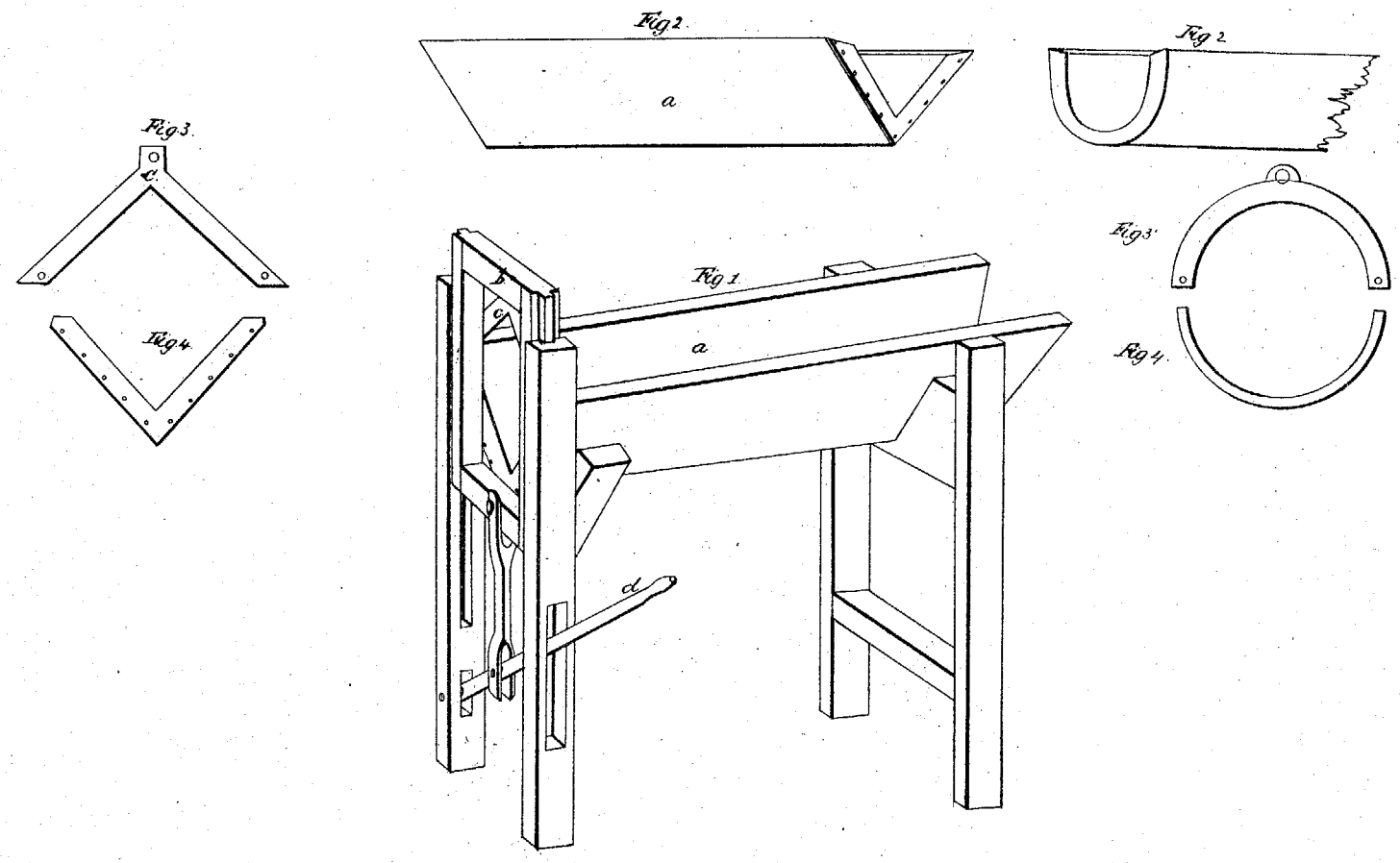

2/3/1836 9351x

Isaac S. Wright, Elbridge, New York.
Letters Patent Dated February 3rd 1836.

The schedule referred to in these Letters Patent and making part of the
same containing a description in the words of the said Isaac S. Wright
himself of his improvement in the Straw cutter.

---

To all whom it may concern

Be it known that I Isaac S. Wright of Elbridge in the County
of Onondaga and State of New York have invented certain improve-
ments in the construction of Machines for cutting Straw and
I do hereby declare that the following is a full and exact
description thereof The Straw to be cut is placed in a trough in the u-
sual way but the trough differs in form from those generally em-
ployed being most commonly made out of two pieces of plank
joined together length wise at right angles, or at any angle
greater or less than a right angle as may be preferred. This
trough has a cutting knife at one end which is fixed onto
a frame sliding up and down in grooves like a mill saw frame
The knife consists of two cutting parts united together at the mid-
dle, so as to form a right angle, or any angle greater or less than a right
angle as may be preferred. The angle of the trough points downwar[ds]
and the angle of the knife upwards, the cutting edge being down-
wards; the gate or frame which carries the knife may be moved
up and down by means of a lever, a treadle, a crank, or an any of the
known ways of producing such motions. The fore edge of the
trough is armed with iron or steel for the knife to cut against.
Both the knife and the trough may instead of being in the angular
shape described be made curvilinear, in which case it will be be[st]
to make the curve a segment of a small circle at the middle coin-
ciding with the angular point above mentioned. The obj-
ect will in either case, be equally well attained, [illegible]

2/3/1836 9351 X

[illegible]ject being so to form the ~~form~~ the knife and the trough, that as the former comes down upon the straw, they shall concur in gathering and forcing it into a compact state. The same end may be partially attained by ~~by~~ the giving the described shape to the knife alone. I intend some times to surmount that part of the trough which is against the knife, by a short angular or curved piece, in the same form with the trough inverted for the purpose of keeping the upper portion of the straw more completely together whilst feeding. The feeding may be performed in any of the usual ways.

What I claim as my invention and wish to secure by Letters Patent is the angular or curved form of the knife as above described, either used with or without a trough similarly formed for the purpose set forth. I do not claim the angular trough when used alone the same having been previously employed, but without an angular or curved knife such as is herein described.

Witnesses
James Brown
Sam[illegible] Mellincaw

I. S. Wright

[illegible]
[illegible]

(Rec^d. & Recorded [illegible] March 29. 1842.) (537 words)

Davis mad[illegible] [illegible]